(12) United States Patent
Okada (10) Patent No.: US 8,305,207 B2
(45) Date of Patent: Nov. 6, 2012

(54) RESET SYSTEM, MOBILE DEVICE, COMMUNICATION DEVICE, AND RESET METHOD

(75) Inventor: Hiroki Okada, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 522 days.

(21) Appl. No.: 12/588,997

(22) Filed: Nov. 4, 2009

(65) Prior Publication Data

US 2010/0117816 A1     May 13, 2010

(30) Foreign Application Priority Data

Nov. 10, 2008    (JP) ................................ 2008-287949

(51) Int. Cl.
*B60C 23/00*     (2006.01)
(52) U.S. Cl. ......... 340/447; 340/442; 73/146; 73/146.2; 116/34 R
(58) Field of Classification Search ............... 340/447, 340/442, 445; 73/146.5, 146.8, 116, 146.2, 73/146, 146.4; 116/34 R, 34 A, 34 B
See application file for complete search history.

(56) References Cited

U.S. PATENT DOCUMENTS

| | | | |
|---|---|---|---|
| 7,661,299 B2* | 2/2010 | Kusunoki | 73/146 |
| 8,115,613 B2* | 2/2012 | Patel et al. | 340/447 |

FOREIGN PATENT DOCUMENTS

| | | |
|---|---|---|
| JP | A-07-186642 | 7/1995 |
| JP | A 2004-082814 | 3/2004 |
| JP | A-2004-189170 | 7/2004 |
| JP | A 2005-247132 | 9/2005 |
| JP | A 2006-299602 | 11/2006 |
| JP | A-2006-525175 | 11/2006 |
| JP | A 2008-184018 | 8/2008 |
| WO | WO 2004/089659 A1 | 10/2004 |

OTHER PUBLICATIONS

Office Action issued in corresponding Japanese Application No. 2008-287949, issued Sep. 21, 2010. (with English-language translation).

\* cited by examiner

*Primary Examiner* — Toan N Pham
(74) *Attorney, Agent, or Firm* — Oliff & Berridge, PLC

(57) ABSTRACT

A reset system includes a communication device mounted on a vehicle; and a mobile device that performs wireless communication with the communication device. The mobile device includes a control instruction unit giving an instruction for controlling an in-vehicle device based on a depressed button, and an instruction unit giving the communication device an instruction for setting a reference value when a predetermined specific button is depressed. The communication device includes an acquisition unit acquiring a tire pressure of the vehicle, a determination unit comparing the tire pressure with the reference value to determine whether the air pressure is abnormal, a control unit controlling an in-vehicle device based on the instruction given from the control instruction unit, and a setting unit, when the instruction has been given from the instruction unit, calculating and setting the reference value based on the tire pressure acquired when the setting instruction has been given.

19 Claims, 1 Drawing Sheet

RESET SYSTEM, MOBILE DEVICE, COMMUNICATION DEVICE, AND RESET METHOD

INCORPORATION BY REFERENCE

The disclosure of Japanese Patent Application No. 2008-287949 filed on Nov. 10, 2008 including the specification, drawings and abstract is incorporated herein by reference in its entirety.

BACKGROUND OF THE INVENTION

1. Field of the Invention

The invention relates to a reset system, a mobile device, a communication device and a reset method, and, more specifically, to a reset system, a mobile device, a communication device and a reset method for a tire pressure measuring system equipped for a mobile unit, such as a vehicle.

2. Description of the Related Art

A recent mobile unit (for example, a vehicle) is equipped with a tire pressure monitoring system (TPMS). The TPMS measures the air pressure of a tire provided for the mobile unit, and performs operation, such as warning, when the measured air pressure is lower than or equal to a threshold. In the TPMS, an air pressure selected by a driver is set as a normal value, and a reference value determined on the basis of the normal value is prestored. Then, for example, the TPMS performs operation, such as warning, when the measured value indicates an abnormal value that is lower than or equal to the reference value.

When the timing at which a reference value is stored is, for example, set at the time immediately after pumping air again to the tire or at the time of tire replacement, a reference value appropriate to a selected normal value may be stored. Japanese Patent Application Publication No. 7-186642 (JP-A-7-186642) describes a tire pressure abnormality warning system as an example of a technique for storing the reference value. In JP-A-7-186642, for example, a reference value is stored when the system receives an instruction for storing a reference value from a user. In addition, in this example, a switch for giving an instruction for storing a reference value is provided near a tire wheel, and a worker who replaces a tire depresses the switch at the time of tire replacement to store the air pressure at the time of tire replacement as a reference value.

However, the technique described in JP-A-7-186642 has the following problem. That is, in JP-A-7-186642, the switch by which a worker or a user gives an instruction for storing a reference value to the tire pressure abnormality warning system is installed at a portion adjacent to each tire on the back side of a vehicle body. In order to install the switch for giving an initializing instruction on the back side of the, vehicle body, it is necessary to provide space for wires that connect each switch to the tire pressure abnormality warning system, space for installing the switches, and the like. This reduces the flexibility of design.

SUMMARY OF THE INVENTION

The invention provides a system that is able to store a reference value for determining whether the air pressure of a tire indicates an abnormal value without reducing the flexibility of design.

A first aspect of the invention provides a reset system. The reset system includes: a communication device mounted on a vehicle; and a mobile device that performs wireless communication with the communication device. The mobile device includes one or more buttons, a control instruction unit that, when any one of the one or more buttons has been depressed, gives a control instruction for controlling a device mounted on the vehicle on the basis of the depressed button, and an instruction unit that, when a predetermined specific button among the one or more buttons has been depressed, gives the communication device a setting instruction for setting reference value, and the communication device includes an acquisition unit that acquires information indicating an air pressure of a tire of the vehicle as vehicle information, a determination unit that compares the air pressure indicated by the vehicle information with the reference value to determine whether the air pressure indicates an abnormal value, a control unit that controls an in-vehicle device mounted on the vehicle on the basis of the control instruction given from the control instruction unit, and a setting unit that, when the setting instruction has been given from the instruction unit, calculates and sets the reference value on the basis of the air pressure indicated by the vehicle information acquired at the time when the setting instruction has been given.

With the first aspect, it is not necessary to provide space for wires that connect a button for resetting a reference value to the control unit, space for installing the button on the back side, or the like, of the body of the vehicle, and it is possible to store the reference value for determining whether the air pressure of a tire is abnormal.

In the first aspect, the instruction unit may give the setting instruction to the communication device when the specific button has been depressed for a predetermined first period of time or more.

With the above aspect, it is possible to determine that the specific button has been erroneously depressed by the user of the mobile device on the basis of a period of time during which the specific button is continuously depressed. Thus, it is possible to prevent a reference value that is not intended by the user from being set.

In the first aspect, the instruction unit may give the setting instruction to the communication device when the specific button has been depressed a predetermined first number of times within a predetermined second period of time.

With the above aspect, it is possible to determine that the specific button has been erroneously depressed by the user of the mobile device on the basis of the number of times the specific button is depressed. Thus, it is possible to prevent a reference value that is not intended by the user from being set.

In the first aspect, the instruction unit may give the setting instruction to the communication device when a plurality of buttons predetermined as the specific button have been depressed substantially at the same time.

With the above aspect, a plurality of buttons should be depressed substantially at the same time in order to give the setting instruction to the communication device. Thus, it is possible to prevent a situation that the specific button has been erroneously depressed by the user of the mobile device to set a reference value that is not intended by the user.

In the first aspect, the instruction unit may continuously give the setting instruction to the communication device through a period of time during which the specific button is depressed, and the setting unit may set the reference value when the setting instruction has been given for a period of time that is longer than or equal to a predetermined third period of time.

With the above aspect, the communication device is able to determine that the setting instruction button has been erroneously depressed by the user of the mobile device on the basis of a period of time during which the setting instruction button is continuously depressed. Thus, it is possible to prevent an unintended reference value from being set through determination made by the communication device.

In the first aspect, the instruction unit may give the setting instruction to the communication device each time the specific button is depressed, and the setting unit may set the reference value when the setting instruction has been given a predetermined second number of times within a predetermined fourth period of time.

With the above aspect, the communication device is able to determine that the setting instruction button has been erroneously depressed by the user of the mobile device on the basis of the number of times the setting instruction button is depressed. Thus, it is possible to prevent an unintended reference value from being set through determination made by the communication device.

In the first aspect, the communication device may further include a notification unit that notifies that the reference value has been set when the reference value has been set by the setting unit.

With the above aspect, the communication device notifies when the reference value has been set by the setting unit. Thus, it is possible to further reliably notify the user that the reference value has been set.

In the first aspect, the notification unit may include an output unit that outputs notification sound indicating that the reference value has been set when the reference value has been set by the setting unit.

With the above aspect, the communication device is able to notify the user in sound that the reference value has been set by the setting unit.

In the first aspect, the communication device may further include a presence determination unit that determines whether the mobile device is present inside a cabin of the vehicle, and the setting unit may set the reference value when the setting instruction has been given from the instruction unit and the presence determination unit determines that the mobile device is present inside the cabin.

With the above aspect, the communication device is able to determine whether the mobile device is present inside the cabin. Thus, the reference value is set and notification sound is output only when the mobile device is present inside the cabin. Therefore, it is possible to prevent a situation that, when the user is present outside the cabin, the button provided to give the setting instruction to the communication device is depressed to set the reference value and then the user misses output notification sound. In addition, it is possible to prevent a situation that the reference value is set without user's intention.

In the first aspect, the mobile device may further include a presence determination unit that determines whether the mobile device is present inside a cabin of the vehicle, and the instruction unit may give the setting instruction to the communication device when the presence determination unit determines that the mobile device is present inside the cabin and when the specific button has been depressed.

With the above aspect, the mobile device is able to determine that the mobile device is present inside the cabin. Thus, the reference value is set and notification sound is output only when the mobile device is present inside the cabin. Therefore, it is possible to prevent a situation that, when the user is present outside the cabin, the button provided to give the setting instruction to the communication device is depressed to set the reference value and then the user misses output notification sound. In addition, it is possible to prevent a situation that the reference value is set without user's intention.

In the first aspect, the communication device may include a presence determination unit that determines whether the mobile device is present inside a cabin of the vehicle or outside the cabin, and the output unit includes an internal output unit that outputs the notification sound toward the inside of the cabin of the vehicle when the presence determination unit determines that the mobile device is present inside the cabin of the vehicle and the reference value has been set by the setting unit, and an external output unit that outputs the notification sound toward the outside of the cabin of the vehicle when the presence determination unit determines that the mobile device is present outside the cabin of the vehicle and the reference value has been set by the setting unit.

With the above aspect, the communication device is able to determine whether the mobile device is present inside the cabin or outside the cabin, and is able to cause the output unit (the internal output unit or the external output unit) provided in correspondence with the determined location to output notification sound. Thus, it is possible to further reliably have the user who carries the mobile device hear notification sound.

In the first aspect, the mobile device may include a presence determination unit that determines whether the mobile device is present inside a cabin of the vehicle or outside the cabin, and the output unit may include an internal output unit that outputs the notification sound toward the inside of the cabin of the vehicle when the presence determination unit determines that the mobile device is present inside the cabin of the vehicle and the reference value has been set by the setting unit, and an external output unit that outputs the notification sound toward the outside of the cabin of the vehicle when the presence determination unit determines that the mobile device is present outside the cabin of the vehicle and the reference value has been set by the setting unit.

With the above aspect, the mobile device is able to determine whether the mobile device is located inside the cabin or outside the cabin, and the communication device is able to cause the output unit (the internal output unit or the external output unit) provided in correspondence with the determined location to output notification sound. Thus, it is possible to further reliably have the user who carries the mobile device hear notification sound.

In the first aspect, the notification unit may include a display unit that displays a notification image indicating that the reference value has been set when the reference value has been set by the setting unit.

With the above aspect, it is possible to notify the user in image that the reference value has been set by the setting unit.

In the first aspect, the communication device may include a presence determination unit that determines whether the mobile device is present inside a cabin of the vehicle or outside the cabin, and the display unit may display the notification image when the presence determination unit determines that the mobile device is present inside the cabin of the vehicle and the reference value has been set by the setting unit.

With the above aspect, the communication device is able to determine whether the mobile device is present inside the cabin, and the reference value is set and a notification image is displayed only when the mobile device is present inside the cabin. Therefore, it is possible to prevent a situation that a notification image is uselessly displayed when the button provided to give a setting instruction to the communication device is depressed to set the reference value while the user is present outside the cabin.

In the first aspect, the mobile device may include a presence determination unit that determines whether the mobile device is present inside a cabin of the vehicle or outside the cabin, and the display unit may display the notification image when the presence determination unit determines that the mobile device is present inside the cabin of the vehicle and the reference value has been set by the setting unit.

With the above aspect, the mobile device is able to determine that the mobile device is present inside the cabin. Thus, the reference value is set and a notification image is displayed only when the mobile device is present inside the cabin. Therefore, it is possible to prevent a situation that a notification image is uselessly displayed when the button provided to give a setting instruction to the communication device is depressed to set the reference value while the user is present outside the cabin.

In the first aspect, the communication device may further include a driving determination unit that determines whether the vehicle is driving, and the setting unit may not set the reference value when the driving determination unit determines that the vehicle is driving.

With the above aspect, it is possible to prevent the reference value from being reset while the vehicle is driving.

In the first aspect, the setting unit may set a numerical value that is obtained by multiplying the air pressure, indicated by the vehicle information acquired by the acquisition unit when the setting instruction has been given, by a predetermined decimal that is smaller than or equal to 1 as the reference value.

With the above aspect, it is possible to set an optimal reference value in response to user's taste.

A second aspect of the invention provides a mobile device that performs wireless communication with a communication device mounted on a vehicle. The mobile device includes: one or more buttons; a control instruction unit that, when any one of the one or more buttons has been depressed, gives a control instruction for controlling a device mounted on the vehicle on the basis of the depressed button; and an instruction unit that, when a predetermined specific button among the one or more buttons has been depressed, gives the communication device a setting instruction for setting a reference value.

A third aspect of the invention provides a communication device that is mounted on a vehicle and that performs wireless communication with a mobile device. The communication device includes: an acquisition unit that acquires information indicating an air pressure of a tire of the vehicle as vehicle information; a determination unit that compares the air pressure indicated by the vehicle information with a reference value to determine whether the air pressure is abnormal; a control unit that controls a device mounted on the vehicle when a control instruction for controlling the device has been given from the mobile device; and a setting unit that sets the reference value when a setting instruction for setting the reference value has been given from the mobile device.

With the mobile device according to the second aspect and the communication device according to the third aspect, similar advantageous effects to those of the reset system according to the above described first aspect may be obtained.

A fourth aspect of the invention provides a reset method for a system formed of a mobile device and a communication device that is mounted on a mobile unit, wherein the mobile device and the communication device perform wireless communication with each other, and wherein the communication device acquires information indicating an air pressure of a tire of the vehicle as vehicle information, and compares the air pressure indicated by the vehicle information with a reference value to determine whether the air pressure is abnormal. The reset method includes: giving a setting instruction for setting the reference value to the communication device when a predetermined specific button among one or more buttons provided for the mobile device has been depressed; and setting the reference value when the setting instruction has been given to the communication device.

With the reset method according to the fourth aspect, similar advantageous effects to those of the reset system according to the above described first aspect may be obtained.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

First Embodiment

Figure 1:
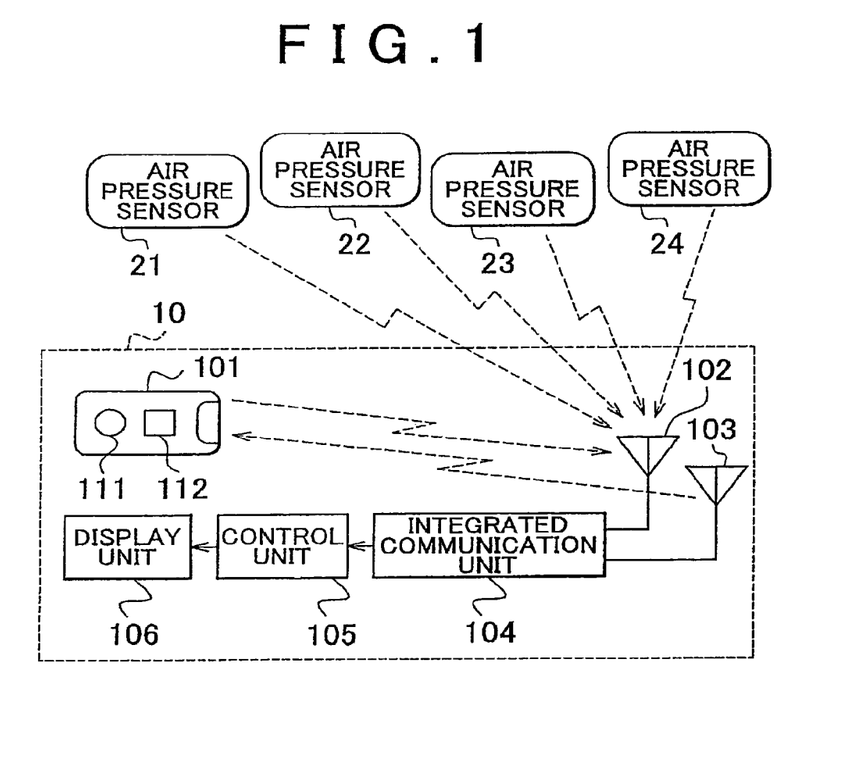
FIG. 1 is a view that shows the schematic configuration of a reset system according to a first embodiment.

FIG. 1 is a block diagram that shows the schematic configuration of a reset system 10 according to a first embodiment of the invention. The reset system 10 includes a mobile device 101, a receiving unit 102, a transmitting unit 103, an integrated communication unit 104, a control unit 105 and a display unit 106. In the description of the present embodiment, the configuration of the reset system 10 shown in FIG. 1, except the mobile device 101, is mounted on a host vehicle.

The mobile device 101 is typically a mobile device that can be carried by a user. The mobile device 101 has a communication circuit (not shown) inside. The communication circuit of the mobile device 101, when receiving a signal that will be wirelessly transmitted from the transmitting unit 103, wirelessly transmits a response signal that indicates a response to the received signal and an instruction signal that indicates an instruction given to the control unit 105 to the receiving unit 102 as will be described later.

The receiving unit 102 is typically an antenna. The receiving unit 102 receives a signal wirelessly transmitted from the communication circuit of the mobile device 101. In addition, the receiving unit 102 receives air pressure information signals that are wirelessly transmitted from respective air pressure sensors 21 to 24, which will be described later.

The transmitting unit 103 is typically an antenna. The transmitting unit 103 is equipped for the host vehicle. The transmitting unit 103 wirelessly transmits a signal acquired from the integrated communication unit 104 to the communication circuit of the mobile device 101.

The integrated communication unit 104 acquires a signal received by the receiving unit 102. The integrated communication unit 104 performs known process (for example, process of decoding in a predetermined modulation scheme; hereinafter, referred to as decoding process) on the acquired signal. In addition, the integrated communication unit 104 acquires a signal generated by the control unit 105. The integrated communication unit 104 performs known process (for example, process of modulating in a predetermined modulation scheme; hereinafter, referred to as modulating process) on the acquired signal.

The control unit 105 generates a signal that will be transmitted from the transmitting unit 103. The signal generated by the control unit 105 is modulated by the integrated communication unit 104, and is then transmitted from the transmitting unit 103. When the control unit 105 generates a signal that will be transmitted from the transmitting unit 103, the control unit 105 determines the type of the transmitting unit 103 used to transmit a signal, and instructs the integrated communication unit 104 about the determined type of the transmitting unit 103.

More specifically, the host vehicle is equipped with at least two types of the transmitting units 103 for respective application purposes. The transmitting units 103, for example, include a transmitting unit 103 (hereinafter, referred to as internal transmitting unit 103) for transmitting a signal to the communication circuit of the mobile device 101 that is located relatively near the host vehicle, such as inside the cabin of the host vehicle, and a transmitting unit 103 (hereinafter, referred to as external transmitting unit 103) for transmitting a signal to the communication unit of the mobile device 101 that is located relatively far from the host vehicle, such as outside the cabin of the host vehicle. At least one transmitting unit 103 is provided for each type. The mounting location of the internal transmitting unit 103 in the host vehicle and the output level thereof are determined so that a signal reaches the mobile device 101 located in the space that is substantially the space inside the cabin. On the other hand, the mounting location of the external transmitting unit 103 in the host vehicle and the output level thereof are determined so that a signal reaches the mobile device 101 located in the space that is substantially predetermined space outside the cabin.

Then, the control unit 105, when generating a signal that will be transmitted from any one of the transmitting units 103, selects and determines the type of the transmitting unit 103 that transmits the generated signal from between the external transmitting unit 103 and the internal transmitting unit 103. When the integrated communication unit 104 acquires the signal generated by the control unit 105, the control unit 105 instructs the integrated communication unit 104 about the type of the transmitting unit 103 that transmits the signal acquired by the integrated communication unit 104 at the same time. The integrated communication unit 104, at the time when instructed by the control unit 105, causes the transmitting unit 103 of the instructed type to acquire the signal acquired from the control unit 105.

One of signals that will be transmitted from any one of the transmitting units 103 by the control unit 105 according to the present embodiment is a response request signal for requiring a response of the mobile device 101. The control unit 105 generates a response request signal at predetermined time intervals. When the control unit 105 generates a response request signal, the control unit 105 instructs the integrated communication unit 104 about the type of the transmitting unit 103 that transmits the generated response request signal. Each time a response request signal is generated at predetermined time intervals by the control unit 105, the response request signal is acquired by the transmitting unit 103 of the type about which the control unit 105 instructs the integrated communication unit 104, and is wirelessly transmitted to the communication circuit of the mobile device 101 at the predetermined time intervals.

As the communication circuit of the mobile device 101 receives the response request signal, the communication circuit wirelessly transmits a response signal that indicates a response to the response request signal to the receiving unit 102. The response signal received by the receiving unit 102 is decoded by the integrated communication unit 104, and is then acquired by the control unit 105. After the control unit 105 has generated a response request signal, the control unit 105 waits for a predetermined waiting time in order to acquire a response signal from the integrated communication unit 104. Then, for example, when the control unit 105 has generated a response request signal that will be transmitted from the external transmitting unit 103, and when the control unit 105 has acquired a response signal by the time when the waiting time elapses from the generation of the response request signal, the control unit 105 determines that the mobile device 101 is present outside the cabin. Similarly, for example, when the control unit 105 has generated a response request signal that will be transmitted from the internal transmitting unit 103, and when the control unit 105 has acquired a response signal by the time when the waiting time elapses from the generation of the response request signal, the control unit 105 determines that the mobile device 101 is present inside the cabin.

Another one of signals that will be transmitted from any one of the transmitting units 103 by the control unit 105 according to the present embodiment is an authentication signal for authentication with mobile device 101 that is determined to be present. As the control unit 105 determines that the mobile device 101 is present, the control unit 105 generates an authentication signal. When the control unit 105 generates an authentication signal, the control unit 105 instructs the integrated communication unit 104 to transmit an authentication signal to the transmitting unit 103 corresponding to one of a location inside the cabin and a location outside the cabin, in which the mobile device 101 is determined to be present. The integrated communication unit 104 acquires the authentication signal generated by the control unit 105, modulates the authentication signal and then causes the transmitting unit 103 of the type about which the control unit 105 instructs the integrated communication unit 104 to acquire the modulated authentication signal. The transmitting unit 103 transmits the acquired authentication signal to the communication circuit of the mobile device 101.

Then, as the communication circuit of the mobile device 101 receives the authentication signal transmitted from the transmitting unit 103, the communication circuit transmits a response signal that indicates a response to the received authentication signal to the receiving unit 102. The control unit 105 and the mobile device 101 exchange an authentication signal and a response signal between each other the number of times necessary for authentication. When the authentication has been normally completed, the control unit 105 enables a user of the mobile device 101 (driver) to operate an in-vehicle device of the host vehicle.

Note that, authentication, for example, includes a process in which an authentication signal generated by the control unit 105 includes information that indicates an identifier (ID code), and a response signal generated by the communication circuit of the mobile device 101 also includes an identifier (ID code) similarly, and then it is determined whether the identifier included in the authentication signal coincides with the identifier included in the response signal. In addition, the reset system 10 according to the present embodiment may use encrypted communication in which a signal that will be transmitted from any of the transmitting units 103 and a signal that will be transmitted from the communication circuit of the mobile device 101 each are encrypted in a predetermined scheme. An encrypted authentication signal generated by the control unit 105 may be transmitted from any of the transmitting units 103, or a signal acquired from the control unit 105 by the integrated communication unit 104 may be encrypted when the acquired signal is modulated.

The mobile device 101 according to the present embodiment, for example, includes a control instruction button 111 and a reset instruction button 112 as shown in FIG. 1. The control instruction button 111 and the reset instruction button 112 are, for example, buttons that may be depressed. When any one of the control instruction button 111 and the reset instruction button 112 is depressed, a switch (not shown) provided for an infernal circuit in correspondence with the depressed button is closed. The mobile device 101 determines the depressed button on the basis of the switch that is closed in the internal circuit, and wirelessly transmits an instruction signal, indicated by an instruction corresponding to the button depressed by the user, from the internal communication circuit to the receiving unit 102.

Note that FIG. 1 shows only one control instruction button 111 as an example; however, the mobile device 101 typically has a plurality of the control instruction buttons 111. For example, as the control instruction button 111 for instructing doors of the host vehicle to be locked is depressed by the user, an instruction signal that indicates an instruction for locking the doors is transmitted to the receiving unit 102. In addition, for example, as the control instruction button 111 for instructing the doors of the host vehicle to be unlocked is depressed by the user, an instruction signal that indicates an instruction for unlocking the doors is transmitted to the receiving unit 102.

The reset instruction button 112 provided for the mobile device 101 serves as a button for giving a reset instruction, which will be described later, to the control unit 105. As the reset instruction button 112 provided for the mobile device 101 is depressed by the user, an instruction signal that indicates a reset instruction is transmitted to the receiving unit 102.

The instruction signal received by the receiving unit 102 is acquired by the integrated communication unit 104 and is decoded. When the control unit 105 has normally completed the above described authentication and then has acquired an instruction signal decoded by the integrated communication unit 104, the control unit 105 performs process on the basis of the acquired instruction signal. More specifically, when the control unit 105 has acquired an instruction signal from the integrated communication unit 104, the control unit 105 determines an instruction indicated by the acquired instruction signal, and controls an in-vehicle device mounted on the host vehicle on the basis of the determined instruction. When the instruction signal acquired by the control unit 105, for example, indicates an instruction for unlocking the doors, the control unit 105 gives an instruction for unlocking the doors to a control processing unit (not shown) that drives an open/close mechanism of the doors of the host vehicle to unlock the doors of the host vehicle. In addition, when the instruction signal acquired by the control unit 105, for example, indicates an instruction for locking the doors, the control unit 105 gives an instruction for locking the doors to the control processing unit (not shown) that drives the open/close mechanism of the doors of the host vehicle to lock the doors of the host vehicle.

The control unit 105 not only performs process on the basis of an instruction signal but also may perform various processes by exchanging signals with the mobile device 101 after authentication has been normally completed. For example, when a door knob (door outside handle) of the host vehicle is provided with a capacitive touch sensor, the control unit 105 detects that the mobile device 101 is present outside the cabin, and, after authentication has been normally completed, prepares for unlocking the doors when the user touches the touch sensor. In addition, for example, when the host vehicle is provided with an engine switch for starting an engine, the control unit 105 detects that the mobile device 101 is present inside the cabin, and, after authentication has been normally completed, for example, prepares for starting the engine when the engine switch is turned on by the user.

Note that, in the above description, the open/close mechanism of the doors of the host vehicle corresponds to an example of the in-vehicle device mounted on the host vehicle; however, an in-vehicle device that can be controlled by an instruction signal is not limited to the doors of the host vehicle. Of course, any in-vehicle devices are applicable as long as the in-vehicle devices are mounted on the host vehicle.

The air pressure sensors 21 to 24 shown in FIG. 1 each periodically transmit an air pressure information signal to the receiving unit 102 at predetermined time intervals. The air pressure sensors 21 to 24 are provided respectively for four tires of the host vehicle. The air pressure sensors 21 to 24 each measure the air pressure of a corresponding one of the tires. The air pressure information signal includes air pressure information that indicates measured air pressure and identification information by which each of the air pressure sensors 21 to 24 is identified.

The air pressure information signal received by the receiving unit 102 is acquired by the integrated communication unit 104, decoded and then acquired by the control unit 105. Each time the control unit 105 acquires an air pressure information signal, the control unit 105 sequentially stores the air pressure, indicated by the air pressure information included in the signal, in a storage unit (not shown) in association with a corresponding one of the air pressure sensors 21 to 24. Furthermore, the storage unit of the control unit 105 prestores a threshold, as a reference value, for determining whether the stored air pressure indicates an abnormal value.

The control unit 105 compares the air pressure, indicated by the air pressure information included in the acquired air pressure information signal, with the reference value while sequentially storing the air pressure in the storage unit. Then, when the air pressure indicated by the air pressure information indicates an abnormal value that is lower than or equal to the reference value, the control unit 105 identifies the air pressure sensor that has transmitted the air pressure information signal that includes the air pressure information indicating the abnormal value on the basis of the identification information included in the air pressure information signal. As the control unit 105 identifies the air pressure sensor that has transmitted the air pressure information signal that includes the air pressure information indicating the abnormal value, the control unit 105 determines that the air pressure of the tire for which the identified air pressure sensor is provided is abnormal, and, for example, issues warning, such as displaying an image for notifying the driver of the abnormality of the air pressure on the display screen of the display unit 106.

The display unit 106 is typically provided at an instrument panel of the host vehicle. The display unit 106 is formed of mechanical meters (for example, a speedometer that indicates the speed of the host vehicle, a tachometer that indicates the rotational speed of the engine of the host vehicle, and the like), a self-luminous indicator that indicates the state of the host vehicle, a liquid crystal display panel that indicates an image showing the state of the host vehicle on the display screen, and the like. In addition, the display unit 106 may be formed of only the liquid crystal display panel that also indicates information, which is supposed to be indicated by the mechanical meters and the self-luminous indicator, in image instead of the meters and the indicator. Furthermore, the display unit 106 may be provided at the instrument panel of the host vehicle or may be provided at any locations in the cabin of the host vehicle as long as the display unit 106 is visible to the driver.

When the control unit 105 performs process to issue the above described warning, an image for notifying the driver of abnormality of the air pressure is displayed on the display screen of the display unit 106 as described above. In this way, a process used in a known system like a tire pressure monitoring system (TPMS) may be applied to the process in which the air pressure of a tire of the host vehicle is measured and, when the measured air pressure indicates an abnormal value, abnormality of the air pressure is notified to the driver, for example.

Incidentally, the normal value of the air pressure needs to be determined on the basis of a driving feel felt by the driver, the model of the host vehicle, the state of a road surface (for example, dry concrete, wet gravel road, or the like) on which the host vehicle is driving, or the like, in order to ensure safety of a passenger.

Then, the mobile device 101 according to the present embodiment is provided with the reset instruction button 112 as described above. For example, as the reset instruction button 112 is depressed by the user of the mobile device 101 (the driver of the host vehicle), an instruction signal that indicates a reset instruction is transmitted to the receiving unit 102 as described above. The instruction signal that indicates the reset instruction received by the receiving unit 102 is acquired by the integrated communication unit 104 and is decoded. As the control unit 105 acquires the instruction signal that indicates the reset instruction from the integrated communication unit 104 after the above described authentication has been completed, the latest air pressure stored in the storage unit at the time when the instruction signal has been acquired is identified as a normal value.

Figure 2:
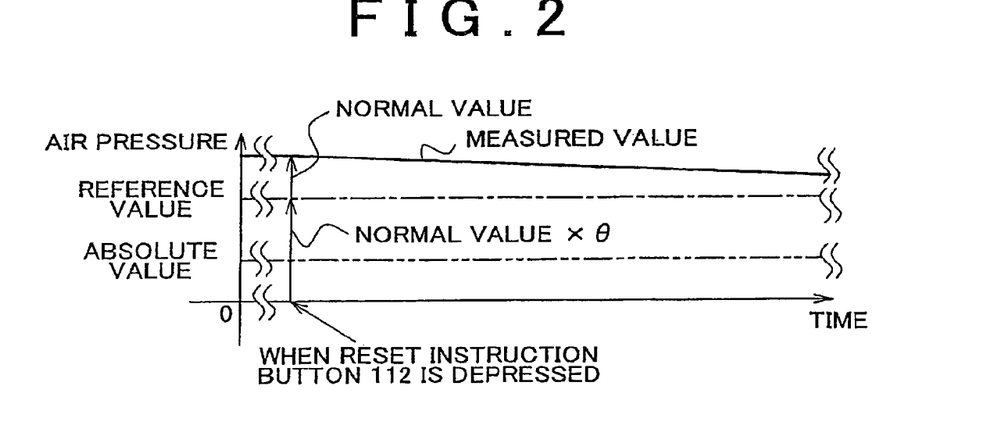
FIG. 2 is a graph that illustrates a reference value and absolute value of a tire pressure.

Here, the reference value stored in the storage unit of the control unit 105 is typically a numerical value that is at a predetermined rate to the normal value of the air pressure as shown in FIG. 2. More specifically, as shown in FIG. 2, the reference value is a numerical value that is obtained by multiplying the normal value of the air pressure by a predetermined positive decimal θ smaller than 1. By storing the numerical value having the predetermined rate to the normal value of the air pressure as the reference value, an optimal reference value may be set on the basis of the normal value that is selected by the user and identified at the time when the user has depressed the reset instruction button 112. Thus, the control unit 105 identifies the air pressure at the time when the driver has depressed the reset instruction button 112 as the normal value. In addition, the control unit 105 calculates the reference value on the basis of the identified normal value of the air pressure and then stores the calculated reference value in the storage unit. When the reference value has been already stored in the storage unit, the control unit 105 updates the already stored reference value with the calculated reference value. The control unit 105 may calculate the reference value on the basis of the air pressure of any one of the tires, which is identified at the time when the control unit 105 has acquired an instruction signal that indicates a reset instruction. Alternatively, the control unit 105 may identify the average value of the air pressures of all the tires at the time when the control unit 105 has acquired an instruction signal that indicates a reset instruction as the normal value and may calculate the reference value on the basis of the average value identified as the normal value.

Note that the control unit 105, when updating the reference value, may delete the air pressures sequentially stored till then from the storage unit. In addition, the control unit 105 may further store the absolute value shown in FIG. 2 in addition to the reference value. When the absolute value is stored in the storage unit, the control unit 105 compares the air pressure with both the reference value and the absolute value while sequentially storing the air pressures as described above. The reference value is a relative value with respect to the numerical value identified as the normal value by the control unit 105. The absolute value is a value irrelevant to the normal value identified by the control unit 105. The absolute value shown in FIG. 2 is prestored in the storage unit of the control unit 105, and the control unit 105 compares the air pressure with the absolute value in addition to the reference value while sequentially storing the air pressures. Thus, the control unit 105 is able to determine that the air pressure is lower than or equal to an absolute value.

As described above, in the reset system 10 according to the present embodiment, the mobile device 101 is provided with the reset instruction button 112, and the reset system 10 is configured so that the reference value may be updated when the button has been depressed. Thus, it is possible to eliminate the necessity of installing switches for updating the reference value on the back side of the vehicle body, or the like. Therefore, with the reset system 10 according to the present embodiment, it is not necessary to provide space for wires that connect the switches to the control unit 105 or space for installing the switches. Thus, it is possible to store a reference value for determining whether the air pressure of a tire indicates an abnormal value, without reducing the flexibility of design.

In the present embodiment, when the reset instruction button 112 is depressed, the communication circuit of the mobile device 101 transmits an instruction signal that indicates a reset instruction to the receiving unit 102. In another embodiment, it is also applicable that the mobile device 101 is provided with one or more control instruction buttons 111 only, and, when predetermined any one control instruction button 111 is continuously depressed through a predetermined period of time or more (for example, 3 seconds or more), the communication circuit of the mobile device 101 transmits an instruction signal that indicates a reset instruction to the receiving unit 102. Then, when the predetermined one control instruction button 111 is not continuously depressed through the predetermined period of time or more, an instruction signal that indicates an instruction corresponding to the original function of the control instruction button 111 is transmitted from the communication circuit of the mobile device 101 to the receiving unit 102. By so doing, it is not necessary to provide the mobile device 101 with space for providing the reset instruction button 112.

In addition, in another embodiment, it is also applicable that the mobile device 101 is provided with one or more control instruction buttons 111 only, and, when predetermined any one control instruction button 111 is depressed a predetermined number of times (for example, twice) within a predetermined period of time, the communication circuit of the mobile device 101 transmits an instruction signal that indicates a reset instruction to the receiving unit 102. Then, when the predetermined one control instruction button 111 is not depressed the predetermined number of times (for example, depressed only once) within the predetermined period of time, an instruction signal that indicates an instruction corresponding to the original function of the control instruction button 111 is transmitted from the communication circuit of the mobile device 101 to the receiving unit 102. By so doing, it is not necessary to provide the mobile device 101 with space for providing the reset instruction button 112.

In addition, in another embodiment, the mobile device 101 may be configured so that the mobile device 101 is not provided with the reset instruction button 112 but provided with two or more control instruction buttons 111 instead and, when predetermined any two or more control instruction buttons 111 have been depressed, the communication circuit of the mobile device 101 transmits an instruction signal that indicates a reset instruction to the receiving unit 102. By so doing, it is not necessary to provide the mobile device 101 with space for providing the reset instruction button 112.

Alternatively, in another embodiment, it is applicable that, when predetermined any two or more control instruction buttons 111 have been depressed, the communication circuit of the mobile device 101 transmits an instruction signal that indicates that the predetermined any two or more control instruction buttons 111 have been depressed to the receiving unit 102. In this case, the control unit 105 may update the reference value as described above when the control unit 105 has acquired an instruction signal that indicates that the predetermined any two or more control instruction buttons 111 have been depressed.

In addition, in the first embodiment, when the reset instruction button 112 has been depressed, the communication circuit of the mobile device 101 transmits an instruction signal that indicates a reset instruction to the receiving unit 102. In another embodiment, it is also applicable that, when the reset instruction button 112 is continuously depressed through a predetermined period of time or more (for example, 3 seconds), the communication circuit of the mobile device 101 transmits an instruction signal that indicates a reset instruction to the receiving unit 102. By so doing, it is possible to determine that the reset instruction button 112 has been erroneously depressed by the user of the mobile device 101 on the basis of a period of time during which the reset instruction button 112 is continuously depressed. Thus, it is possible to prevent an unintended reference value from being set.

Similarly, in another embodiment, it is also applicable that, when the reset instruction button 112 has been depressed a predetermined number of times (for example, twice) within a predetermined period of time (for example, within 1 second), the communication circuit of the mobile device 101 transmits an instruction signal that indicates a reset instruction to the receiving unit 102. By so doing, it is possible to determine that the reset instruction button 112 has been erroneously depressed by the user of the mobile device 101 on the basis of the number of times the reset instruction button 112 has been depressed. Thus, it is possible to prevent an unintended reference value from being set.

In addition, in another embodiment, it is also applicable that the communication circuit of the mobile device 101 is configured to continuously transmit an instruction signal that indicates a reset instruction to the receiving unit 102 through a period during which the reset instruction button 112 is depressed and, when the control unit 105 has continuously acquired the instruction signal that indicates the reset instruction for a predetermined period of time, the reference value is updated as described above. By so doing, when the user of the mobile device 101 has erroneously depressed the reset instruction button 112, it is possible to prevent an unintended reference value from being set by the user through determination made by the control unit 105.

Similarly, in another embodiment, the communication circuit of the mobile device 101 is configured so as to transmit an instruction signal that indicates a reset instruction to the receiving unit 102 each time the reset instruction button 112 is depressed, and the reference value is updated as described above when the control unit 105 has acquired an instruction signal that indicates a reset instruction a predetermined number of times (for example, twice) within a predetermined period of time (for example, within a second). By so doing as well, it is possible to prevent an unintended reference value from being set by the user through determination made by the control unit 105.

In addition, in another embodiment, it is applicable to perform notification process of at least any one of a notification sound output process and a notification display process. In the notification sound output process, when the control unit 105 has updated the reference value, the control unit 105 causes a speaker to output notification sound, indicating that the reference value has been updated, toward the inside of the cabin of the host vehicle. In the notification display process, when the control unit 105 has updated the reference value, the control unit 105 causes the display screen of the display unit 106 to display a notification image indicating that the reference value has been updated. By so doing, it is possible to further reliably notify the user that the reference value has been updated by the control unit 105.

In addition, in another embodiment, it is also applicable that, only when the control unit 105 that performs the above described notification process determines that the mobile device 101 is present inside the cabin as described above and has acquired an instruction signal that indicates a reset instruction, the reference value is updated. By so doing, it is possible to, for example, prevent a situation that, when the reset instruction button 112 has been depressed although the user of the mobile device 101 is present outside the cabin, the notification sound output process is performed by the control unit 105 and then the user misses the above notification sound or a situation that the notification display process is performed by the control unit 105 and then a notification image is uselessly displayed although the user of the mobile device 101 is present outside the cabin.

In addition, in another embodiment, a response request signal generated by the control unit 105 that performs notification process may include information that indicates the type of the transmitting unit 103 from which the response request signal is transmitted. By so doing, the mobile device 101 is able to determine that the mobile device 101 itself is present inside the cabin when the communication circuit of the mobile device 101 receives a response request signal transmitted from the transmitting unit 103 and the information included in the received signal indicates the internal transmitting unit 103 as the type of the transmitting unit 103. When the mobile device 101 determines that the mobile device 101 itself is present inside the cabin, the mobile device 101 produces a response signal that includes information indicating that the mobile device 101 itself is present inside the cabin and transmits the response signal from the communication circuit to the receiving unit 102. Then, the control unit 105 acquires the response signal that includes information indicating that the mobile device 101 is present inside the cabin, and then the control unit 105 and the mobile device 101 authenticate each other as described above.

After the authentication has been completed, as the reset instruction button 112 is depressed, the communication circuit of the mobile device 101 generates an instruction signal that indicates a reset instruction to include information that the mobile device 101 itself is present inside the cabin and then transmits the instruction signal to the receiving unit 102. The control unit 105 acquires the instruction signal received by the receiving unit 102 via the integrated communication unit 104. Then, when the acquired instruction signal indicates a reset instruction, and includes information indicating that the mobile device 101 is present inside the cabin, the reference value may be updated as described above. By so doing, the mobile device 101 is able to determine that the user who carries the mobile device 101 is present inside the cabin.

Thus, it is possible to prevent a situation that, when the reset instruction button 112 has been depressed although the user is present outside the cabin, the notification sound output process is performed by the control unit 105 and then the user misses the above notification sound or a situation that the notification display process is performed by the control unit 105 and then a notification image is uselessly displayed although the user of the mobile device 101 is present outside the cabin. In addition, it is possible to update the reference value only when the mobile device 101 is present inside the cabin.

In addition, in another embodiment, it is also applicable that, when notification sound is output as the above described notification process, the control unit 105 selects any one of a speaker that is provided for the host vehicle and that outputs notification sound toward the inside of the cabin of the host vehicle and a speaker that is provided for the host vehicle and that outputs notification sound toward the outside of the cabin of the host vehicle, and then causes the selected speaker to output notification sound. More specifically, it is also applicable that the control unit 105 determines whether the mobile device 101 is present inside the cabin or outside the cabin as described above, updates the reference value when the control unit 105 has acquired an instruction signal that indicates a reset instruction and, in addition, when the reference value has been updated, causes a speaker, provided to output notification sound toward the determined location (inside the cabin or outside the cabin) at which the mobile device 101 is present, to output notification sound. Then, when the location of the mobile device 101, determined at the time when the reference value has been updated, is inside the cabin, the control unit 105 may further perform the above described notification display process. By so doing, depending on a location at which the user is present, it is possible for the control unit 105 to further reliably notify the user who carries the mobile device 101 that the reference value has been updated.

In addition, in another embodiment, a response request signal generated by the control unit 105 may include information that indicates the type of the transmitting unit 103 from which the response request signal will be transmitted. Then, the mobile device 101 uses the communication circuit to receive the response request signal transmitted from the transmitting unit 103, and determines a location at which the mobile device 101 is present (inside the cabin or outside the cabin) on the basis of the information that is included in the received signal and that indicates the type of the transmitting unit 103. As the mobile device 101 determines the location of the mobile device 101, the mobile device 101 generates a response signal that includes information indicating the determined location and then transmits the response signal from the communication circuit to the receiving unit 102. The control unit 105 acquires the response signal that is transmitted by the mobile device 101 and that includes the location of the mobile device 101, and then the control unit 105 and the mobile device 101 authenticate each other as described above.

As the reset instruction button 112 is depressed after authentication has been completed, the communication circuit of the mobile device 101 transmits an instruction signal, that indicates a reset instruction and that includes information indicating the location of the mobile device 101, to the receiving unit 102. The control unit 105 acquires the instruction signal received by the receiving unit 102 through the integrated communication unit 104 and, when the acquired instruction signal indicates a reset instruction, updates the reference value as described above. Furthermore, it is also applicable that the control unit 105 determines the location of the mobile device 101 on the basis of the information included in the acquired instruction signal, and causes a speaker, provided to output notification sound toward the location of the mobile device 101, to output notification sound. Then, when the location of the mobile device 101, determined at the time when the reference value is updated, is inside the cabin, the control unit 105 may further perform the above described notification display process. By so doing, depending on a location at which the user is present, it is possible for the control unit 105 to further reliably notify the user who carries the mobile device 101 that the reference value has been updated.

In addition, in another embodiment, it is also applicable that the control unit 105 determines whether the host vehicle is driving on the basis of, for example, the driving speed of the host vehicle and, when the host vehicle is driving, does not update the reference value even when the control unit 105 acquires an instruction signal that indicates a reset instruction.

In addition, in the description of the first embodiment, one reference value is stored in the storage unit of the control unit 105; however, in another embodiment, two or more reference values may be stored in the storage unit. For example, the control unit 105 may store a reference value for the air pressure of a front wheel and a reference value for the air pressure of a rear wheel and then may separately determine whether the air pressure of a tire of the front wheel indicates an abnormal value and whether the air pressure of a tire .of the rear wheel indicates an abnormal value. At this time, the value of a decimal θ for calculating a reference value may be the same for each reference value to be calculated or may be different between the respective reference values.

In addition, in the description of the first embodiment, the control unit. 105 starts authentication when the control unit 105 has acquired a response signal that indicates a response to a response request signal and, after the authentication has been normally completed, performs process on the basis of an instruction indicated by an instruction signal. However, in another embodiment, when the control unit 105 has acquired a signal (for example, instruction signal) other than a response signal to a response request signal, the control unit 105 may determine whether the mobile device 101 is present inside the cabin or outside the cabin as described above. After that, when authentication is started and is then normally completed, the control unit 105 may perform process based on the instruction indicated by the acquired instruction signal.

In addition, the control unit 105 may be implemented in such a manner that an LSI, a CPU, a microcomputer, or the like, interprets and executes predetermined program data by which the above described process stored in a storage device (ROM, RAM, hard disk, or the like) may be performed. Here, the CPU may be a CPU that constitutes an electronic control unit (ECU) mounted on a mobile unit, such as a vehicle. In addition, in this case, the program data may be introduced into the storage device via a storage medium or may be directly executed from a storage medium. Note that the storage medium may be a semiconductor memory, such as a ROM, a RAM and a flash memory, an magnetic disk memory, such as a flexible disk and a hard disk, an optical disk memory, such as a CD-ROM, a DVD and a BD, a memory card, and the like.

In addition, the functions of the components of the reset system 10 described above may be applied and implemented in a configuration that has a combination of part of or all of various systems mounted on the host vehicle. For example, the functions of the components of the above described reset system 10 may be added and implemented in a configuration that has a combination of part of or whole of a smart entry system mounted on the host vehicle with part of or whole of the TPMS.

In addition, the above described all the embodiments may be, of course, embodied in any combinations.

The embodiment of the invention is described above; however, the above description is only examples of the invention in any respect, and is not intended to limit the scope of the invention. Of course, the embodiment of the invention may be improved or modified in various forms without departing from the scope of the invention.

With the aspect of the invention, it is possible to perform an instruction for setting the reference value of a tire pressure from the mobile device, and is, for example, useful in a system, or the like, that monitors the air pressures of tires provided for a host vehicle.

What is claimed is:

1. A reset system comprising:
a communication device that is mounted on a vehicle; and
a mobile device that performs wireless communication with the communication device, wherein
the mobile device includes one or more buttons, a control instruction unit that, when any one of the one or more buttons has been depressed, gives a control instruction for controlling a device mounted on the vehicle on the basis of the depressed button, and an instruction unit that, when a predetermined specific button among the one or more buttons has been depressed, gives the communication device a setting instruction for setting a reference value, and
the communication device includes an acquisition unit that acquires information indicating an air pressure of a tire of the vehicle as vehicle information, a determination unit that compares the air pressure indicated by the vehicle information with the reference value to determine whether the air pressure indicates an abnormal value, a control unit that controls an in-vehicle device mounted on the vehicle on the basis of the control instruction given from the control instruction unit, and a setting unit that, when the setting instruction has been given from the instruction unit, calculates and sets the reference value on the basis of the air pressure indicated by the vehicle information acquired at the time when the setting instruction has been given.

2. The reset system according to claim 1, wherein the instruction unit gives the setting instruction to the communication device when the specific button has been depressed for a predetermined first period of time or more.

3. The reset system according to claim 1, wherein the instruction unit gives the setting instruction to the communication device when the specific button has been depressed a predetermined first number of times within a predetermined second period of time.

4. The reset system according to claim 1, wherein the instruction unit gives the setting instruction to the communication device when a plurality of buttons predetermined as the specific button have been depressed substantially at the same time.

5. The reset system according to claim 1, wherein the instruction unit continuously gives the setting instruction to the communication device through a period of time during which the specific button is depressed, and the setting unit sets the reference value when the setting instruction has been given for a period of time that is longer than or equal to a predetermined third period of time.

6. The reset system according to claim 1, wherein the instruction unit gives the setting instruction to the communication device each time the specific button is depressed, and the setting unit sets the reference value when the setting instruction has been given a predetermined second number of times within a predetermined fourth period of time.

7. The reset system according to claim 1, wherein the communication device further includes a notification unit that notifies that the reference value has been set when the reference value has been set by the setting unit.

8. The reset system according to claim 7, wherein the notification unit includes an output unit that outputs notification sound indicating that the reference value has been set when the reference value has been set by the setting unit.

9. The reset system according to claim 8, wherein the communication device further includes a presence determination unit that determines whether the mobile device is present inside a cabin of the vehicle, and the setting unit sets the reference value when the setting instruction has been given from the instruction unit and the presence determination unit determines that the mobile device is present inside the cabin.

10. The reset system according to claim 8, wherein the mobile device further includes a presence determination unit that determines whether the mobile device is present inside a cabin of the vehicle, and the instruction unit gives the setting instruction to the communication device when the presence determination unit determines that the mobile device is present inside the cabin and when the specific button has been depressed.

11. The reset system according to claim 8, wherein the communication device includes a presence determination unit that determines whether the mobile device is present inside a cabin of the vehicle or outside the cabin, and the output unit includes an internal output unit that outputs the notification sound toward the inside of the cabin of the vehicle when the presence determination unit determines that the mobile device is present inside the cabin of the vehicle and the reference value has been set by the setting unit, and an external output unit that outputs the notification sound toward the outside of the cabin of the vehicle when the presence determination unit determines that the mobile device is present outside the cabin of the vehicle and the reference value has been set by the setting unit.

12. The reset system according to claim 8, wherein the mobile device includes a presence determination unit that determines whether the mobile device is present inside a cabin of the vehicle or outside the cabin, and the output unit includes an internal output unit that outputs the notification sound toward the inside of the cabin of the vehicle when the presence determination unit determines that the mobile device is present inside the cabin of the vehicle and the reference value has been set by the setting unit, and an external output unit that outputs the notification sound toward the outside of the cabin of the vehicle when the presence determination unit determines that the mobile device is present outside the cabin of the vehicle and the reference value has been set by the setting unit.

13. The reset system according to claim 7, wherein the notification unit includes a display unit that displays a notification image indicating that the reference value has been set when the reference value has been set by the setting unit.

14. The reset system according to claim 13, wherein the communication device includes a presence determination unit that determines whether the mobile device is present inside a cabin of the vehicle or outside the cabin, and the display unit displays the notification image when the presence determination unit determines that the mobile device is present inside the cabin of the vehicle and the reference value has been set by the setting unit.

15. The reset system according to claim 13, wherein the mobile device includes a presence determination unit that determines whether the mobile device is present inside a cabin of the vehicle or outside the cabin, and the display unit displays the notification image when the presence determination unit determines that the mobile device is present inside the cabin of the vehicle and the reference value has been set by the setting unit.

16. The reset system according to claim 1, wherein the communication device further includes a driving determination unit that determines whether the vehicle is driving, and the setting unit does not set the reference value when the driving determination unit determines that the vehicle is driving.

17. The reset system according to claim 1, wherein the setting unit sets a numerical value that is obtained by multiplying the air pressure, indicated by the vehicle information acquired by the acquisition unit when the setting instruction has been given, by a predetermined decimal that is smaller than or equal to 1 as the reference value.

18. A communication device that is mounted on a vehicle and that performs wireless communication with a mobile device, comprising:
   an acquisition unit that acquires information indicating an air pressure of a tire of the vehicle as vehicle information;
   a determination unit that compares the air pressure indicated by the vehicle information with a reference value to determine whether the air pressure is abnormal;
   a control unit that controls a device mounted on the vehicle when a control instruction for controlling the device has been given from the mobile device; and
   a setting unit that sets the reference value when a setting instruction for setting the reference value has been given from the mobile device.

19. A reset method for a system formed of a mobile device and a communication device that is mounted on a mobile unit, wherein the mobile device and the communication device perform wireless communication with each other, and wherein the communication device acquires information indicating an air pressure of a tire of the vehicle as vehicle information, and compares the air pressure indicated by the vehicle information with a reference value to determine whether the air pressure is abnormal, the reset method comprising:
   giving a setting instruction for setting the reference value to the communication device when a predetermined specific button among one or more buttons provided for the mobile device has been depressed; and
   setting the reference value when the setting instruction has been given to the communication device.

* * * * *